Feb. 17, 1953     W. J. PURCHAS, JR     2,628,867
DUPLEX NOZZLE
Filed Jan. 7, 1948

Inventor
William J. Purchas Jr.
By
Spencer, Willits, Helmig & Baillie
Attorneys

Patented Feb. 17, 1953

2,628,867

UNITED STATES PATENT OFFICE 2,628,867

DUPLEX NOZZLE

William J. Purchas, Jr., Grand Rapids, Mich., assignor to General Motors Corporation, Detroit, Mich., a corporation of Delaware Application January 7, 1948, Serial No. 926

4 Claims. (Cl. 299—118)

1

This invention generally relates to liquid spray nozzles and more particularly to improvements in nozzles of the variable discharge rate and spray pattern type.

The principal object of the invention is the provision of a nozzle assembly comprising a novel arrangement of few parts of simple form to provide adjustable discharge flow rate means which is readily accessible by removal of certain parts and variable discharge spray patterns.

The parts and the arrangement thereof constituting the nozzle assembly by which this object is accomplished will become apparent by reference to the following detailed description and drawings of a nozzle which is particularly adapted for fuel spray combustion apparatus.

Figure 1 of the drawings is a longitudinal cross sectional view of the nozzle assembly.

Figure 1:
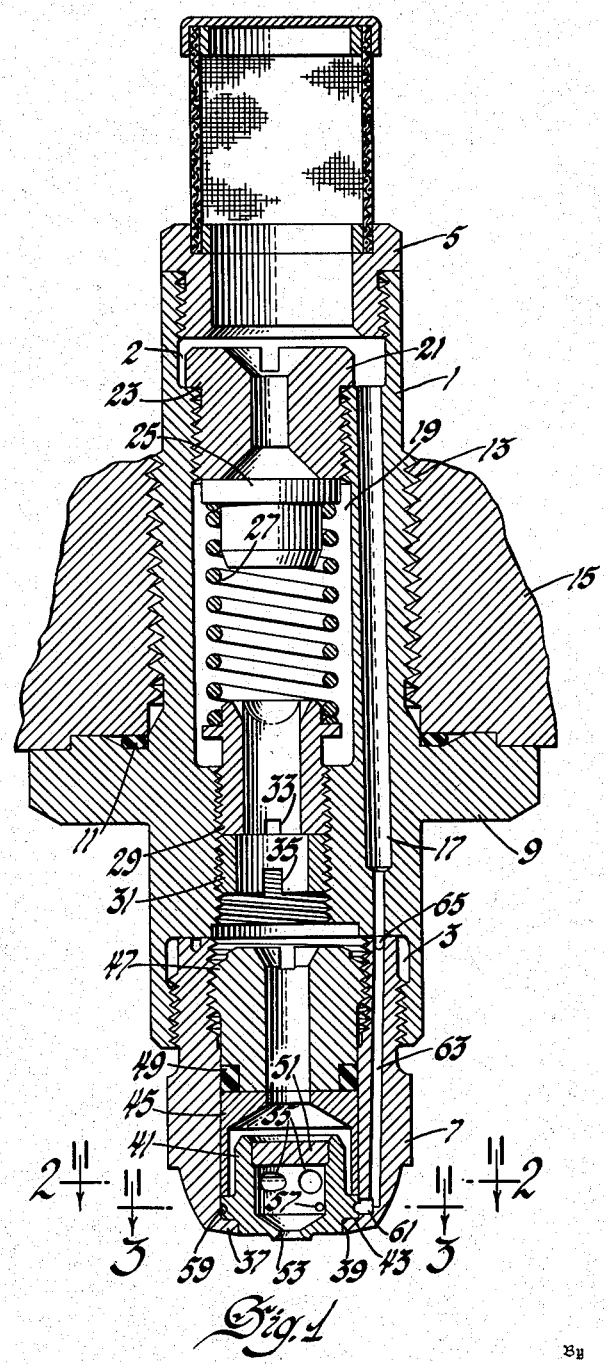

The nozzle assembly illustrated in Figure 1 of the drawings comprises a body 1 having internally threaded counterbores 2—3 in opposite ends, a filter element 5 screwed in the counterbore 2 and a hollow cap member 7 screwed in the other counterbore 3. The body 1 is provided with an external mounting flange 9 having an annular groove in one face containing a gasket 11 and an externally threaded portion 13 shown screwed in a threaded opening of variable fuel pressure fitting 15 to retain the flange 9 and gasket 11 thereon in fluid tight relation with the fitting 15 and to position the filter element within the fitting. The nozzle body 1 has small and large diameter fuel supply passages 17 and 19 extending between the faces of the end counterbores 2—3. A hollow valve seat 21 having an external flange 23 and a threaded portion is screwed in the large diameter passage 19 to retain the flange 23 seated on the face of the counterbore 2. A valve head 25 is normally seated on the valve seat 21 by means of a helical compression spring 27 placed in the passage 19 and engageable at one end with the valve head 25 and at the other end with an adjustable abutment 29 threaded in the other end of the passage 19 and locked therein by a threaded locking collar 31. The adjustable abutment 29 and locking collar 31 therefor are provided with adjusting grooves 33—35 which are engageable by tools upon removal of the nozzle cap 7.

The cap 7 is provided with an internal flange 37 adjacent the axial opening 39 in the outer end and a hollow cylindrical fuel discharge spray tip 41 provided with an external flange 43 is seated on the cap flange 37 by means of an annular spacer 45 and a bushing 47 threaded into the

2 inner end of the cap. The inner end face of the bushing 47 is provided with a groove containing a gasket 49 and this face and gasket is in fluid tight contact with the inner face of the spacer 45. The spacer 45 has an enlarged internal diameter outer end portion surrounding the cylindrical inner end portion of the tip which is closed by a plug 51 and the inner face of the spacer bears only on the peripheral portion of the inner face of the tip flange 43 and holds the opposite face in contact with the cap flange. The bushing 47 and spacer 45 thus form a fuel space surrounding the inner end of the tip 41 and communicating with the large diameter supply passage 19 in the body 1. An axial discharge orifice having a small diameter throat and end walls 53 diverging inwardly and outwardly therefrom is provided in the outer end of the tip 41 contained in the cap opening 39.

Figure 2:
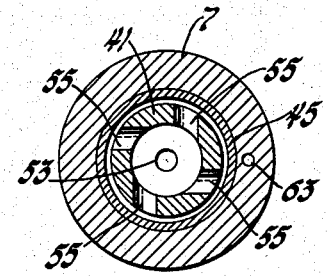
Figure 2 is a transverse cross sectional view taken on line 2—2 of Figure 1.

As best seen in Figures 1 and 2, four fuel inlet orifices 55 extend tangentially with respect to the internal cylindrical surface of the tip through the cylindrical wall thereof adjacent the plug 51 in the inner end to cause whirling of the fuel entering these orifices from the body passage 19 upon unseating of the valve head 25 by a value of supply fuel pressure sufficient to overcome the spring.

Figure 3:
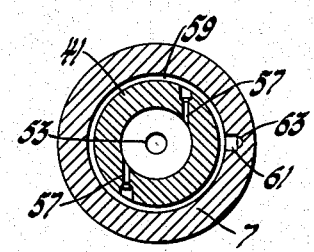
Figure 3 is a transverse cross sectional view taken on line 3—3 of Figure 1.

As best seen in Figures 1 and 3 two other smaller diameter fuel inlet orifices 57 are shown extending tangentially in the same manner with respect to the internal cylindrical surface of the tip from a groove 59 formed in the peripheral surface of the tip flange 43 adjacent the discharge orifice 53. A recess 61 formed in the cap adjacent this groove leads to a longitudinal cap passage 63 extending to an annular groove 65 in the inner face of the cap 7 with which the small diameter body fuel supply passage 17 registers.

With the above described fuel spray nozzle, when fuel enters the filter element 5 at a low value of pressure insufficient to cause unseating of the valve head 25 in the large diameter passage 19 in the body 1, fuel at this low pressure will pass through the small diameter supply passage 17 in the body 1, to and through the cap groove 65, passage 63 and recess 61 to and through the tip groove 59 and small diameter tangential orifices 57 adjacent the discharge orifice 53. The fuel entering the orifices 57 is whirled therein and discharged through the small diameter discharge orifice throat 53 having inwardly and outwardly diverging walls in a wide angle conical spray pattern.

Upon an increase in the fuel supply pressure sufficient to unseat the valve head 25 from the valve seat 21 in the large diameter body supply passage 19 against the force of the spring 27, fuel passes through the valve, to and through the bushing 47 and spacer 45 in the cap, and enters the larger diameter tangential orifices 55 in the tip 41. This causes greater whirling action of the fuel in the tip and an increase in pressure therein and greater fuel discharge from the discharge orifice throat 53 as fuel is supplied thereto through both of the body supply passages 17—19, resulting in a narrower angle conical spray pattern.

The lower fuel volume and pressure discharge rate and wide angle conical spray pattern condition is suitable for lower heat output and ignition by an igniter located to one side of the discharge orifice in this spray pattern and the higher fuel volume and pressure discharge rate and narrow angle conical spray pattern condition does not impinge upon the igniter and provides a higher heat output.

The removal of the cap 7 exposes the adjustable valve spring abutment 29 and locking collar 31 therefor and thereby enables the change-over between low and high fuel volume and pressure delivery rates and change-over between wide and narrow angle spray patterns to be obtained for a selected value of delivery pressure.

The tip 41 is the only part of the nozzle which requires a drilling operation. All the other parts of the assembly may be formed by simple machining operations, are readily assembled and disassembled, and provide a simpler inexpensive variable fuel delivery rate and spray pattern nozzle.

I claim:

1. A fuel supply nozzle comprising a body, a fuel inlet filter removably secured to one end of said body, a cap removably secured to the other end of said body, small and large area fuel supply passages in said body extending between said filter and said cap, said large area passage having a valve seat removably secured therein adjacent said filter, an axially adjustable hollow abutment therein adjacent said cap, a valve head and a spring between said head and said abutment for holding said head on said valve seat, said cap having separate large and small area fuel supply passages each in communication with a similar area body passage, a hollow cylindrical spray tip unit having a plugged inner end and an axial discharge orifice in the other end projecting outwardly from said cap, said spray tip unit having a group of inlet orifices extending tangentially through the cylindrical wall of said unit immediately adjacent said discharge orifice and communicating with a small area body passage through the small area cap passage and a second group of inlet orifices extending through the cylindrical wall of said unit in a similar tangential relation and axially spaced from said other group of inlet orifices, said second group of inlet orifices communicating with the large area cap and body passages.

2. A fuel supply nozzle comprising a body with a fuel inlet at one end of said body, a cap removably secured to the other end of said body, small and large area fuel supply passages in said body extending between said inlet and said cap, said large area passage having a valve seat removably secured therein adjacent said inlet, an axially adjustable hollow abutment therein adjacent said cap, a valve head and a spring between said head and said abutment for holding said head on said valve seat, said cap having separate large and small area fuel supply passages each in communication with a similar area body passage, a hollow cylindrical spray tip unit having a plugged inner end and an axial discharge orifice in the other end projecting outwardly from said cap, said spray tip unit having a group of inlet orifices extending tangentially through the cylindrical wall of said unit immediately adjacent said discharge orifice and communicating with a small area body passage through the small area cap passage and a second group of inlet orifices extending through the cylindrical wall of said unit in a similar tangential relation and axially spaced from said other group of inlet orifices, said second group of inlet orifices communicating with the large area cap and body passages.

3. A fuel supply nozzle comprising a body with a fuel inlet at one end of said body, a cap removably secured to the other end of said body, small and large area fuel supply passages in said body extending between said inlet and said cap, said large area passage having a valve seat removably secured therein adjacent said inlet, an axially adjustable hollow abutment therein adjacent said cap, a valve head and a spring between said head and said abutment for holding said head on said valve seat, said cap defining separate large and small area fuel supply passages each in communication with a similar area body passage, and a hollow cylindrical spray tip unit mounted in said cap, said spray tip unit having at least one inlet orifice communicating with a small area body passage through the small area cap passage and at least one inlet orifice communicating with the large area cap and body passages.

4. A fuel supply nozzle comprising a body with a fuel inlet at one end of said body, a cap removably secured to the other end of said body, small and large area fuel supply passages in said body extending between said inlet and said cap, said large area passage having a valve seat secured therein, an axially adjustable hollow abutment therein between said valve seat and said cap, a valve head and a spring between said head and said abutment for holding said head on said valve seat, said cap defining separate large and small area fuel supply passages each in communication with a similar area body passage, and a spray tip unit retained on said body by said cap, the spray tip unit communicating with said large and small area passages, all so constructed and arranged that removal of said cap provides access to said abutment for adjustment thereof.

WILLIAM J. PURCHAS, Jr.

REFERENCES CITED

The following references are of record in the file of this patent:

UNITED STATES PATENTS

| Number | Name | Date |
|---|---|---|
| Re. 20,027 | Wettstein | June 30, 1936 |
| 1,439,320 | Morse | Dec. 19, 1922 |
| 1,822,047 | Leask | Sept. 8, 1931 |
| 1,873,781 | Nightingale | Aug. 23, 1932 |
| 1,884,931 | Voorhis | Oct. 25, 1932 |
| 2,044,720 | Fletcher | June 16, 1936 |
| 2,313,298 | Martin et al. | Mar. 9, 1943 |

FOREIGN PATENTS

| Number | Country | Date |
|---|---|---|
| 367,510 | Italy | Jan. 25, 1939 |
| 409,211 | Great Britain | Apr. 26, 1934 |
| 579,417 | Great Britain | Aug. 2, 1946 |